US012638588B2

(12) United States Patent　　　(10) Patent No.:　US 12,638,588 B2
Tisdale et al.　　　　　　　　　　(45) **Date of Patent:　　*May 26, 2026**

(54) DETERMINING YAW ERROR FROM MAP DATA, LASERS, AND CAMERAS

(71) Applicant: Waymo LLC, Mountain View, CA (US)

(72) Inventors: John Tisdale, Oakland, CA (US); Michael Montemerlo, Mountainview, CA (US); Andrew Chatham, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 18/156,538

(22) Filed: Jan. 19, 2023

(65) Prior Publication Data

US 2023/0152461 A1　　May 18, 2023

Related U.S. Application Data

(63) Continuation of application No. 16/856,275, filed on Apr. 23, 2020, now Pat. No. 11,675,084, which is a
(Continued)

(51) Int. Cl.
　*G01S 17/89*　　　(2020.01)
　*G01S 7/48*　　　(2006.01)
　　　　　(Continued)
(52) U.S. Cl.
　CPC ............ *G01S 17/89* (2013.01); *G01S 7/4808* (2013.01); *G01S 7/497* (2013.01); *G06V 10/751* (2022.01); *G06V 20/56* (2022.01); *H04N 7/185* (2013.01)

(58) Field of Classification Search
　CPC ........ G01S 7/497; G01S 17/89; G01S 7/4808; G06K 9/00791; G06K 9/6202; H04N 7/185; G06V 10/751; G06V 20/56
　See application file for complete search history.

(56) References Cited

U.S. PATENT DOCUMENTS 5,774,824　A　　6/1998　Streit et al.
8,437,936　B2　　5/2013　Schwarz et al.
　　　　　(Continued)

FOREIGN PATENT DOCUMENTS

CN　　　104835138　　　8/2015
CN　　　106462943　　　2/2017
　　　　　(Continued)

OTHER PUBLICATIONS

Japanese Patent Office, Office Action mailed on Feb. 1, 2023, issued in connection with Japanese Patent Application No. 2021-100730, 6 pages (with English translation).
(Continued)

*Primary Examiner* — Ruiping Li
(74) *Attorney, Agent, or Firm* — McDonnell Boehnen Hulbert & Berghoff LLP

(57)　　　　　ABSTRACT

The present disclosure relates to methods and systems that facilitate determination of a pose of a vehicle based on various combinations of map data and sensor data received from light detection and ranging (LIDAR) devices and/or camera devices. An example method includes receiving point cloud data from a (LIDAR) device and transforming the point cloud data to provide a top-down image. The method also includes comparing the top-down image to a reference image and determining, based on the comparison, a yaw error. An alternative method includes receiving camera image data from a camera and transforming the camera image data to provide a top-down image. The method also includes comparing the top-down image to a reference
(Continued)

image and determining, based on the comparison, a yaw error.

20 Claims, 17 Drawing Sheets

Related U.S. Application Data continuation of application No. 15/658,800, filed on Jul. 25, 2017, now Pat. No. 10,670,725.

(51) Int. Cl.

| | |
|---|---|
| *G01S 7/497* | (2006.01) |
| *G06V 10/75* | (2022.01) |
| *G06V 20/56* | (2022.01) |
| *H04N 7/18* | (2006.01) |

(56) References Cited

U.S. PATENT DOCUMENTS

| | | | | |
|---|---|---|---|---|
| 9,043,072 | B1 | 5/2015 | Tisdale et al. | |
| 9,052,721 | B1 | 6/2015 | Dowdall et al. | |
| 9,568,611 | B2 | 2/2017 | Cosatto et al. | |
| 9,665,100 | B2 | 5/2017 | Shashua et al. | |
| 2008/0123961 | A1* | 5/2008 | Nelson | G06V 10/255 |
| | | | | 345/661 |
| 2010/0228420 | A1 | 9/2010 | Lee | |
| 2013/0135474 | A1 | 5/2013 | Sakano et al. | |
| 2013/0231825 | A1 | 9/2013 | Chundrlik, Jr. et al. | |
| 2013/0265424 | A1 | 10/2013 | Zhang et al. | |
| 2014/0118504 | A1 | 5/2014 | Shima et al. | |
| 2015/0341629 | A1* | 11/2015 | Zeng | H04N 17/002 |
| | | | | 348/187 |
| 2015/0362587 | A1 | 12/2015 | Rogan et al. | |
| 2016/0266256 | A1 | 9/2016 | Allen et al. | |
| 2017/0015317 | A1 | 1/2017 | Fasola et al. | |
| 2017/0123434 | A1 | 5/2017 | Urano et al. | |
| 2017/0305462 | A1* | 10/2017 | Janardhana | B60R 1/00 |

FOREIGN PATENT DOCUMENTS

| | | |
|---|---|---|
| CN | 106969763 | 7/2017 |
| JP | H10-47978 | 2/1998 |
| JP | 2006-277738 | 10/2006 |
| JP | 2013-002820 | 1/2013 |
| JP | 2014-211787 | 11/2014 |
| KR | 20100052717 | 5/2010 |
| KR | 20120011533 | 2/2012 |

OTHER PUBLICATIONS

Japanese Patent Office, Office Action mailed on Jul. 25, 2022, issued in connection with Japanese Patent Application No. 2021-100730, 9 pages (with English translation).

International Search Authority, International Search Report and Written Opinion mailed on Nov. 5, 2018, issued in connection with International Patent Application PCT/US2018/041465, filed on Jul. 10, 2018, 11 pages.

European Patent Office, Extended European Search Report mailed on Nov. 24, 2020, issued in connection with European Patent Application No. 18839133.8, 7 pages.

Chinese Patent Office, First Office Action mailed on Nov. 17, 2020, issued in connection with Chinese Patent Application No. 201880049813.6, 36 pages (with English translation).

Hu Xiaoping, Fundamentals of Navigation Technology, National Defense Industry Press, Jul. 2015, Version 1.

Notification of Reexamination from China Intellectual Property Administration for Chinese Application No. 201880049813.6, dated Apr. 10, 2024.

* cited by examiner

Right Side View

Front View

Back View

Top View

Top-down View

Top-down View

Top-down View

– – – – –  Reference Data

————  Camera Image

350

Top-down View

Top-down View

Top-down View

Top-down View

- - - - -  Reference Data

———— LIDAR Point Cloud

450

Top-down View

Forward View

Forward View

Forward View

- - - - Reference Data / LIDAR Point Cloud Data
———— Camera Image

Forward View

602 — Receiving point cloud data from a light detection and ranging (LIDAR) device 604 — Transforming the point cloud data to provide a top-down image 606 — Comparing the top-down image to a reference image 608 — Determining, based on the comparison, a yaw error 702 — Receiving camera image data from a camera 704 — Transforming the camera image data to provide a top-down image 706 — Comparing the top-down image to a reference image 708 — Determining, based on the comparison, a yaw error

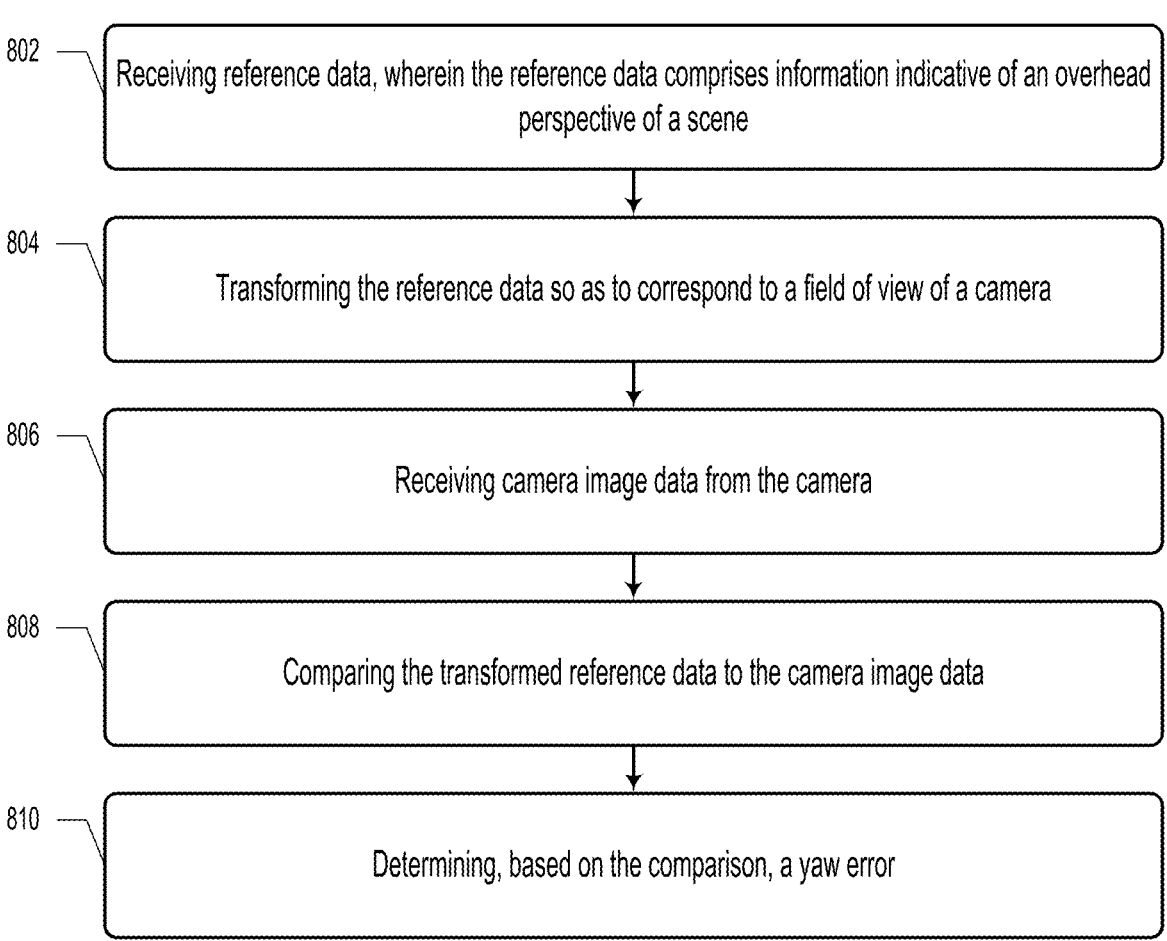

802 — Receiving reference data, wherein the reference data comprises information indicative of an overhead perspective of a scene 804 — Transforming the reference data so as to correspond to a field of view of a camera 806 — Receiving camera image data from the camera 808 — Comparing the transformed reference data to the camera image data 810 — Determining, based on the comparison, a yaw error

Figure 8

DETERMINING YAW ERROR FROM MAP DATA, LASERS, AND CAMERAS

CROSS-REFERENCE TO RELATED APPLICATION

This application is a continuation of U.S. patent application Ser. No. 16/856,275, filed Apr. 23, 2020, which is a continuation of U.S. patent application Ser. No. 15/658,800, filed Jul. 25, 2017. These applications are incorporated herein by reference in their entirety and for all purposes.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Autonomous vehicles may include one or more sensors that are configured to detect information about the environment in which the vehicle operates.

Such sensors may include a light detection and ranging (LIDAR) device. A LIDAR can estimate distance to environmental features while scanning through a scene to assemble a "point cloud" indicative of reflective surfaces in the environment. Other sensors may include a visible light camera configured to capture image frames of the environment around the vehicle and/or a RADAR device configured to detect objects using radio frequency signals.

SUMMARY

The present disclosure relates to methods and systems that facilitate determination of a pose of a vehicle based on various combinations of map data and sensor data received from light detection and ranging (LIDAR) devices and/or camera devices. For example, the present disclosure may provide systems and methods for determining and correcting a yaw error of a vehicle pose estimator.

In a first aspect, a method is provided. The method includes receiving point cloud data from a light detection and ranging (LIDAR) device. The method also includes transforming the point cloud data to provide a top-down image. The method further includes comparing the top-down image to a reference image and determining, based on the comparison, a yaw error.

In a second aspect, a method is provided. The method includes receiving camera image data from a camera and transforming the camera image data to provide a top-down image. The method also includes comparing the top-down image to a reference image and determining, based on the comparison, a yaw error.

In a third aspect, a method is provided. The method includes receiving reference data, wherein the reference data is provided from an overhead perspective. The method further includes transforming the reference data so as to correspond to a field of view of a camera and receiving camera image data from the camera. The method additionally includes comparing the transformed reference data to the camera image data and determining, based on the comparison, a yaw error.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 8 illustrates a method, according to an example embodiment.

DETAILED DESCRIPTION

Figure 1:
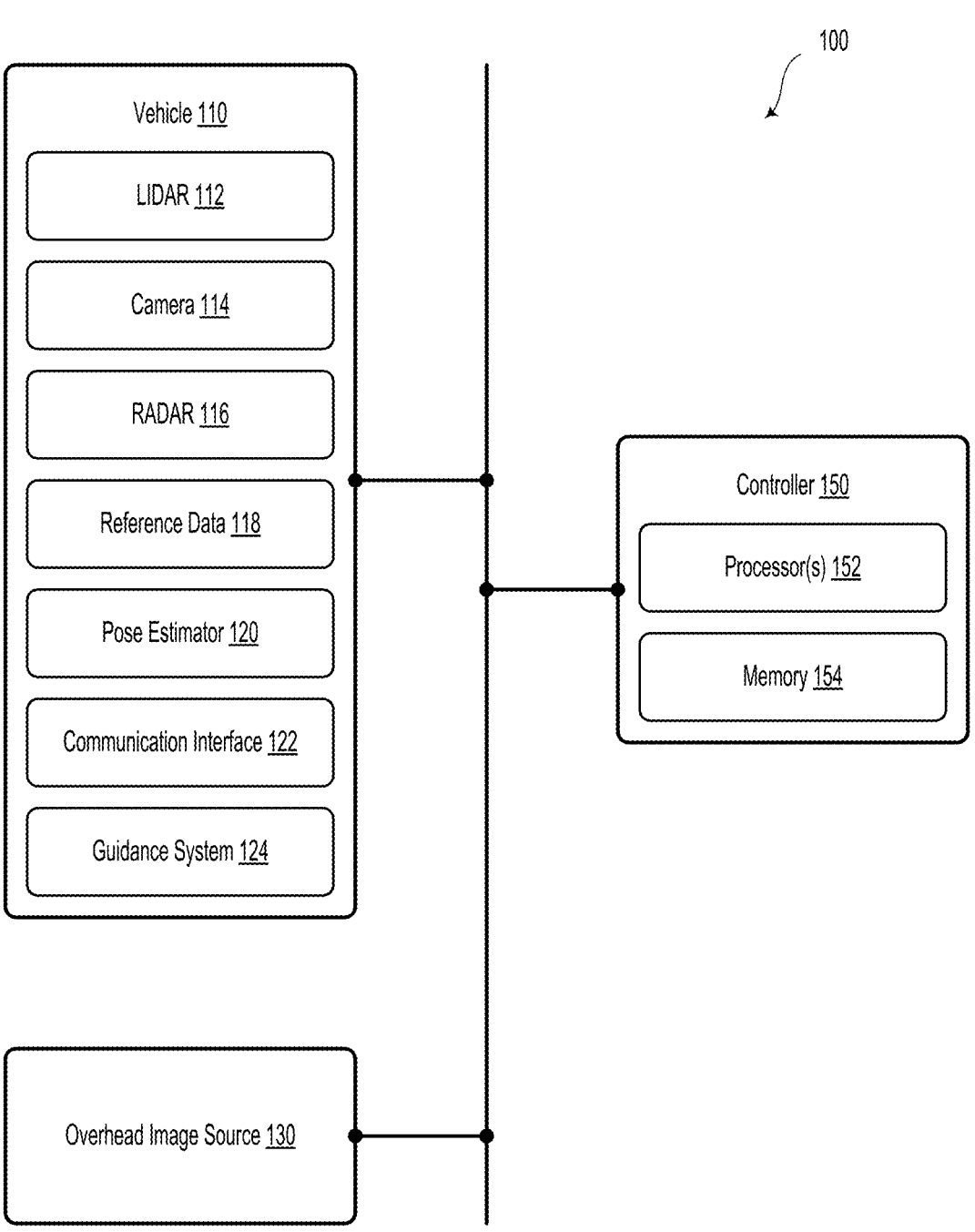
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Conventional vehicle navigation systems may combine inertial sensors (e.g., accelerometers and gyroscopes) with aiding sensors (e.g., global positioning system (GPS), wheel speed sensors, camera, LIDAR, etc.) and/or supplementary information (e.g., maps) to determine a pose of the vehicle.

Systems and methods described herein provide accurate, frequent measurements of a pose of a vehicle, specifically its yaw, or heading. In many driving scenarios (e.g., while traveling on a relatively flat surface), the yaw of the vehicle may include a compass orientation of the vehicle (e.g. north, south, east, west, etc).

Yaw measurements may be provided by GPS or by inferring yaw error based on the lateral position error with respect to a map. However, it is desirable to determine yaw errors directly. Described herein are systems and methods that can determine small yaw errors directly from a map by using LIDAR, radio detection and ranging (RADAR), and/or camera information.

In an example embodiment, point cloud data may be projected into a top-down image and compared to map data. Based on the comparison between the projected point cloud data and the map data, the yaw error may be directly determined. For example, the yaw error may be determined as a rotational angle adjustment that is suitable to register (e.g., align or match) the projected point cloud data correctly to the map data. The determined yaw error may then be provided to the inertial navigation system as an adjustment signal.

In some other embodiments, camera image data may be projected into a top-down image and compared to map data. Based on the comparison between the projected image data and the map data, the yaw error may be directly determined in a similar fashion as described above.

In further embodiments, map data may be projected into a perspective corresponding to the camera image frame. In such a scenario, left-to-right registration errors between the map data and camera images may directly provide the yaw error.

In some embodiments, the map data may include reference data that could be generated from prior camera images, LIDAR point clouds, RADAR data, satellite imagery, other types of imagery, or other information about environment. Such information may be processed offline (e.g., by a cloud server) and, in some embodiments, stored locally on the vehicle.

The yaw error may be inferred by various matching techniques, including normalized cross-correlation or other image registration methods. In some embodiments, the matching could be performed on-board the vehicle or could be performed, at least in part, by a cloud server or another type of distributed computing system. In an example embodiment, the image comparison and yaw error adjustment could be performed in near-real-time. Additionally or alternatively, the image comparison could be performed off-line to obtain information about, for example, long-term drift of a given sensor or reference data.

The systems and methods described herein may provide improved accuracy and reliability with regard to pose estimation for vehicles. By providing more accurate and reliable pose information, the overall localization of the vehicle may be better determined, which may lead to better perception, planning, obstacle avoidance, map-building, surveying, and change detection. Additionally or alternatively, the accurate yaw information obtained with the methods and systems described herein may be utilized with a variety of driving behaviors such as lane keeping, obstacle avoidance, general navigation and routing, etc. Furthermore, in some cases, the methods and systems described herein may provide better yaw determination while using relatively low quality or low accuracy sensors.

II. Example Systems

FIG. 1 illustrates a system 100, according to an example embodiment. As shown, system 100 includes a vehicle 110, an overhead image source 130, and a controller 150.

Vehicle 110 may include a car, truck, aircraft, boat, mobile robot or another type of moving object. The vehicle 110 may include various sensors, such as one or more LIDAR systems 112, one or more cameras 114, and/or one or more RADAR systems 116. In some embodiments, vehicle 110 may move in a semi- or fully-autonomous manner, based, at least in part, on information received from the various sensors and/or reference data 118.

The LIDAR 112 may be configured to provide information (e.g., point cloud data) about one or more objects (e.g., location, shape, etc.) in the environment of the vehicle 110. For instance, the LIDAR 112 may emit light pulses into the environment. The emitted light pulses may interact with objects in the environment to form reflected light and the LIDAR 112 may receive at least a portion of the reflected light as a reflected signal. For example, the LIDAR 112 may compare a time at which each respective light pulse is emitted with a time when each corresponding reflected light pulse is received and determine the distance between the one or more objects and the vehicle 110 based on the comparison.

In some embodiments, LIDAR 112 may be configured to rotate about an axis (e.g., a vertical axis of vehicle 110). In such scenarios, a three-dimensional map of a 360 degree view of the environment of the vehicle 110 can be determined without frequent recalibration of the arrangement of the various components of the LIDAR 110. Additionally or alternatively, LIDAR 112 can be configured to tilt its axis of rotation to control the portion of the environment within which the LIDAR may provide environmental data.

In some embodiments, point cloud data obtained by the LIDAR 112 may be flattened, edited, or otherwise adjusted so as to form a top-down image of the environment of the vehicle 110. For example, at least a portion of the three-dimensional point cloud data may be ignored, culled, and/or transformed so as to provide the top-down image.

The camera 114 may be configured to capture still or video images. Camera 114 may include an image sensor operable to provide information indicative of a field of view of the camera 114. In some embodiments, camera 114 may include an array of charge-coupled devices (CCDs) and/or an array of complementary metal oxide semiconductor (CMOS) detector devices. Other types of detectors are possible. Such detectors may be operable in the visible light wavelengths and/or in other wavelengths (e.g., infrared). In an example embodiment, the camera 114 could be a forward-looking camera (e.g., have a field of view corresponding to a forward direction of vehicle 110).

Additionally or alternatively, the camera 114 could include a plurality of cameras with respective fields of view to cover some or all of an environment around the vehicle 110. For example, the camera 114 may include a plurality of cameras configured to capture a 360 degree image of the surroundings of the vehicle 110. In such a scenario, each camera 114 of the plurality of cameras may capture a respective image. The corresponding plurality of images may be stitched or otherwise combined to form a top-down image of the environment around the vehicle 110. That is, the top-down image could be formed based on one or more projective geometry transforms applied to the plurality of images.

RADAR 116 could include a system configured to actively estimate distances to environmental features by emitting radio signals and detecting returning reflected signals. In such a scenario, distances to radio-reflective features can be determined according to the time delay between transmission and reception. The RADAR 116 can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

In some embodiments, the RADAR 116 may include directional antennas, which may be used for directional transmission and/or reception of RADAR signals to associate each range estimate with a bearing. More generally, directional antennas can also be used to focus radiated energy on a given field of view of interest. Combining the measured distances and the directional information allows for the surrounding environment features to be mapped. The RADAR sensor can thus be used, for instance, by an autonomous vehicle control system to avoid obstacles indicated by the sensor information.

Vehicle 110 may receive, store, and/or process reference data 118. In various embodiments, reference data 118 could include a map or other information indicative of an environment of the vehicle 110. For example, reference data 118 may include map data and/or overhead imagery. For example, the reference data 118 may include overhead imagery from an aircraft or satellite.

Additionally or alternatively, the reference data 118 could include previously-captured camera images (e.g., captured by camera 114 or another camera). Yet further, the reference data 118 could include previously-captured LIDAR point cloud data (e.g., captured by LIDAR 112 or another LIDAR system), or previously-captured RADAR data (e.g., captured by RADAR 116 or another RADAR system). The reference data 118 may include information about an environment of the vehicle 110. For example, the reference data 118 may include information about roads, building, landmarks (e.g., geographic locations), and other physical characteristics about the environment of the vehicle 110. In some embodiments, the reference data 118 could be updated in real time. Furthermore, in some embodiments, the reference data 118 may be requested and/or received from a map database, which may be stored locally or remotely (e.g., on a cloud-based computing network). Other types of reference data 118 are possible and contemplated herein.

The system 100 also includes a pose estimator 120. The pose estimator 120 may be configured to approximate, estimate, determine, calculate, or take other actions to ascertain pose information about the vehicle 110. The pose information of the vehicle 110 could include, among other possibilities, a yaw value (or heading), a pitch value, a roll value, an altitude, and/or a location of the vehicle 110. In other words, the pose estimator 120 may be operable to determine a current orientation and/or location of the vehicle in one, two, and/or three-dimensions.

In some embodiments, the yaw value of the vehicle 110 may be provided in units of degrees. For example, if the vehicle 110 is headed, or facing, north, the yaw value provided by the pose estimator 120 may be 0°. South may correspond to a yaw value of 180°, and east and west may correspond to yaw values of 90° and 270°, respectively. It will be understood that other ways of expressing yaw values, either in degrees, decimal numbers, or other types of nomenclature are possible and contemplated herein.

In a similar manner, the pitch and/or roll values of the vehicle 110 may be provided by the pose estimator 120 as a function of degrees or another variable. The altitude of the vehicle 110 may be provided by the pose estimator 120 as a function of feet or meters, or another measure of absolute or relative height. The location of the vehicle 110 could be provided by the pose estimator 120 in global position system coordinates or in another type of absolute or relative coordinate system.

The pose estimator 120 may include a processor and a memory. In some embodiments, the pose estimator 120 could include a field-programmable gate array (FPGA) or an application-specific integrated circuit (ASIC). In some embodiments, the pose estimator 120 could be another type of computing system. Furthermore, the pose estimator 120 could be disposed locally (e.g., on-board) and/or remotely with regard to the vehicle 110 (e.g., cloud computing networks). In some embodiments, some or all of the functions of the pose estimator 120 could be carried out by the controller 150, described elsewhere herein.

The vehicle 110 may additionally include a communication interface 122. The communication interface 122 may be configured to provide communication between the vehicle 110 and other systems, such as the controller 150, the overhead image source 130, one or more computing networks, and/or other vehicles. In some embodiments, the communication interface 122 could provide a communication link between various elements of the vehicle 110.

The communication interface 122 could be, for example, a system configured to provide wired or wireless communication between one or more other vehicles, sensors, or other entities, either directly or via a communication network. To this end, the communication interface 122 may include an antenna and a chipset for communicating with the other vehicles, sensors, servers, or other entities either directly or via the communication network. The chipset or communication interface 122 in general may be arranged to communicate according to one or more types of wireless communication (e.g., protocols) such as BLUETOOTH, BLUETOOTH LOW ENERGY (BLE), communication protocols described in IEEE 802.11 (including any IEEE 802.11 revisions), cellular technology (such as GSM, CDMA, UMTS, EV-DO, WiMAX, or LTE), ZIGBEE, dedicated short range communications (DSRC), and radio frequency identification (RFID) communications, among other possibilities. The communication interface 122 may take other forms as well.

The vehicle 110 additionally includes a guidance system 124. The guidance system 124 may include a GPS, an inertial measurement unit (IMU), a gyroscope, and/or another type of device configured to provide information indicative of a location or pose of the vehicle 110. The GPS may be any sensor (e.g., location sensor) configured to estimate a geographic location of the vehicle 110. To this end, the GPS may include a transceiver configured to estimate a position of the vehicle 110 with respect to the Earth. The GPS may take other forms as well. The IMU may include a combination of sensors configured to sense position and orientation changes of the vehicle 110 based on inertial acceleration. In some embodiments, the combination of sensors may include, for example, accelerometers and gyroscopes. Other combinations of sensors are possible as well.

The guidance system 124 may include various navigation and pathing capabilities, which may determine, at least in part, a driving path for the vehicle 110. The guidance system 124 may additionally be configured to update the driving path dynamically while the vehicle 110 is in operation. In some embodiments, the guidance system 124 may be configured to incorporate data from a sensor fusion algorithm, the GPS, the LIDAR system 112, and one or more predetermined maps (e.g., reference data 118) so as to determine the driving path for the vehicle 110. Guidance system 124 may also include an obstacle avoidance system, which may be configured to identify, evaluate, and avoid or otherwise negotiate obstacles in the environment in which the vehicle 110 is located. The vehicle 110 may additionally or alternatively include components other than those shown.

In some implementations, system 100 may include an overhead image source 130. In an example embodiment, the overhead image source 130 may be configured to capture map data, images, or other types of information so as to provide an overhead view of at least a portion of the environment around the vehicle 110. In some scenarios, the vehicle 110 may receive and store the map data from the overhead image source 130, which may be an aircraft (e.g., a drone mapping aircraft) or a satellite. As an example, map data could be stored with the overhead image source 130, at the vehicle 110, and/or elsewhere.

System 100 also includes a controller 150. The controller 150 includes one or more processors 152 and at least one memory 154. The controller 150 could be located onboard the vehicle 110 or remotely (e.g., a cloud computing network). Additionally or alternatively, some portions of the controller 150 may be disposed on the vehicle 110 while other portions of the controller 150 are disposed elsewhere.

The controller 150 may include an on-board computer, an external computer, or a mobile computing platform, such as a smartphone, tablet device, personal computer, wearable device, etc. Additionally or alternatively, the controller 150 may include, or be connected to, a remotely-located computer system, such as a cloud server. In an example embodiment, the controller 150 may be configured to carry out some or all method blocks or steps described herein.

The processor 152 may include, for instance, an application-specific integrated circuit (ASIC) or a field-programmable gate array (FPGA). Other types of processors, computers, or devices configured to carry out software instructions are contemplated herein. The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The controller 150 may be configured to carry out various sensor fusion algorithms, functions, or tasks. For example, the controller 150 may be configured to carry out a sensor fusion algorithm and/or a computer program product storing an algorithm. In carrying out the sensor fusion algorithm, the controller 150 may receive or otherwise accept data from various sensors (e.g., LIDAR 112, camera 114, RADAR 116 and/or other sensors) as an input. The data may include, for example, data representing information sensed at the various sensors of the vehicle's sensor system. The sensor fusion algorithm may include, for example, a Kalman filter, a Bayesian network, an algorithm configured to perform some of the functions of the methods herein, or another algorithm. The sensor fusion algorithm may further be configured to provide various assessments based on the data from the sensor system, including, for example, evaluations of individual objects and/or features in the environment in which the vehicle 110 is located, evaluations of particular situations, and/or evaluations of possible impacts based on particular situations. Other assessments are possible as well.

The controller 150 may include a computer vision system, which may include a system configured to process and analyze images captured by at least one of: the LIDAR 112, camera 114, and/or RADAR 116 in an effort to identify objects and/or features in the environment in which the vehicle 110 is located. Such objects or features may include, for example, traffic signals, other vehicles, pedestrians, cyclists, landmarks, road signs, roadways, construction zones, and other types of objects or obstacles. To this end, the computer vision system may use an object recognition algorithm, a Structure from Motion (SFM) algorithm, video tracking, or other computer vision techniques. In some embodiments, the computer vision system may additionally be configured to map the environment, track objects, estimate the speed of objects, etc.

In some embodiments, the controller 150 may be configured to carry out various image processing and/or point cloud data processing functions. That is, controller 150 may be configured to provide top-down images based on respective camera images, RADAR data, and/or point cloud data.

The processor(s) 152 may be configured to execute program instructions stored in memory 154 so as to carry out operations. As such, controller 150 may be configured to carry out any or all of the operations described herein.

For example, the controller 150 may be configured to cause one or more sensor systems of the vehicle 110 to provide camera images, point cloud data, and/or radar data, which may provide information about objects in the environment of vehicle 110. In some embodiments, the controller 150 may cause the one or more sensor systems to provide information about a desired portion or region of the environment of the vehicle 110.

In an example, the controller 150 may receive point cloud data from the LIDAR 112 and transform the point cloud data to provide a top-down image. In an example embodiment, the top-down image may include a flattened two-dimensional image of the environment around the vehicle 110.

The controller 150 could also compare the top-down image to a reference image and determine, based on the comparison, a yaw error. In such a scenario, the reference image includes at least a portion of map data (e.g., reference data 118). In an example embodiment, the reference image includes at least a portion of at least one of: one or more prior camera images, a prior LIDAR point cloud, prior RADAR data, satellite imagery, or other overhead imagery.

The comparison of the top-down image to the reference image may be performed in various ways. For example, the comparison may be performed with one or more of normalized cross-correlation, grayscale matching, gradient matching, histogram matching, edge detection (e.g., Canny edge detection), scale-invariant feature transform (SIFT), and/or speeded-up robust features (SURF). Additionally or alternatively, in some embodiments, the comparison may include various image registration or morphing algorithms.

The controller 150 could also provide an adjustment signal to pose estimator 120. The adjustment signal could be based, at least in part, on the determined yaw error.

In such a scenario, the pose estimator 120 may be configured to determine a yaw orientation of the vehicle 110.

Upon receiving the adjustment signal, the pose estimator 120 may update a current estimated yaw orientation of the vehicle 110.

In some embodiments, the controller 150 could be configured to carry out other operations to correct a determined yaw value based on a comparison between camera image data with map data. For example, the controller 150 may receive camera image data from camera 114. In an example, the camera image data includes information indicative of an environment around the vehicle 110.

The controller 150 may transform the camera image data to provide a top-down image. The top-down image includes a flattened two-dimensional image of the environment around the vehicle. In some embodiments, the transformation of the camera image data providing the top-down image may include a geometric perspective transform algorithm or another type of image processing.

As in prior examples described herein, controller 150 could be configured to compare the top-down image to a reference image (e.g., reference data 118) and determine, based on the comparison, a yaw error and adjust the current yaw orientation of the vehicle 110.

Additionally or alternatively, the controller 150 may be configured to compare camera data to transformed map data. For example, the controller 150 may receive reference data 118. In such a scenario, the reference data 118 may include an image provided from an overhead perspective. The reference data 118 may then be transformed by controller 150 so as to correspond to a field of view of the camera. The controller 150 may also be configured to receive camera image data from the camera and compare the camera image data to the transformed reference data. Based on the comparison, the controller 150 may determine, based on the comparison, a yaw error.

Figure 2:
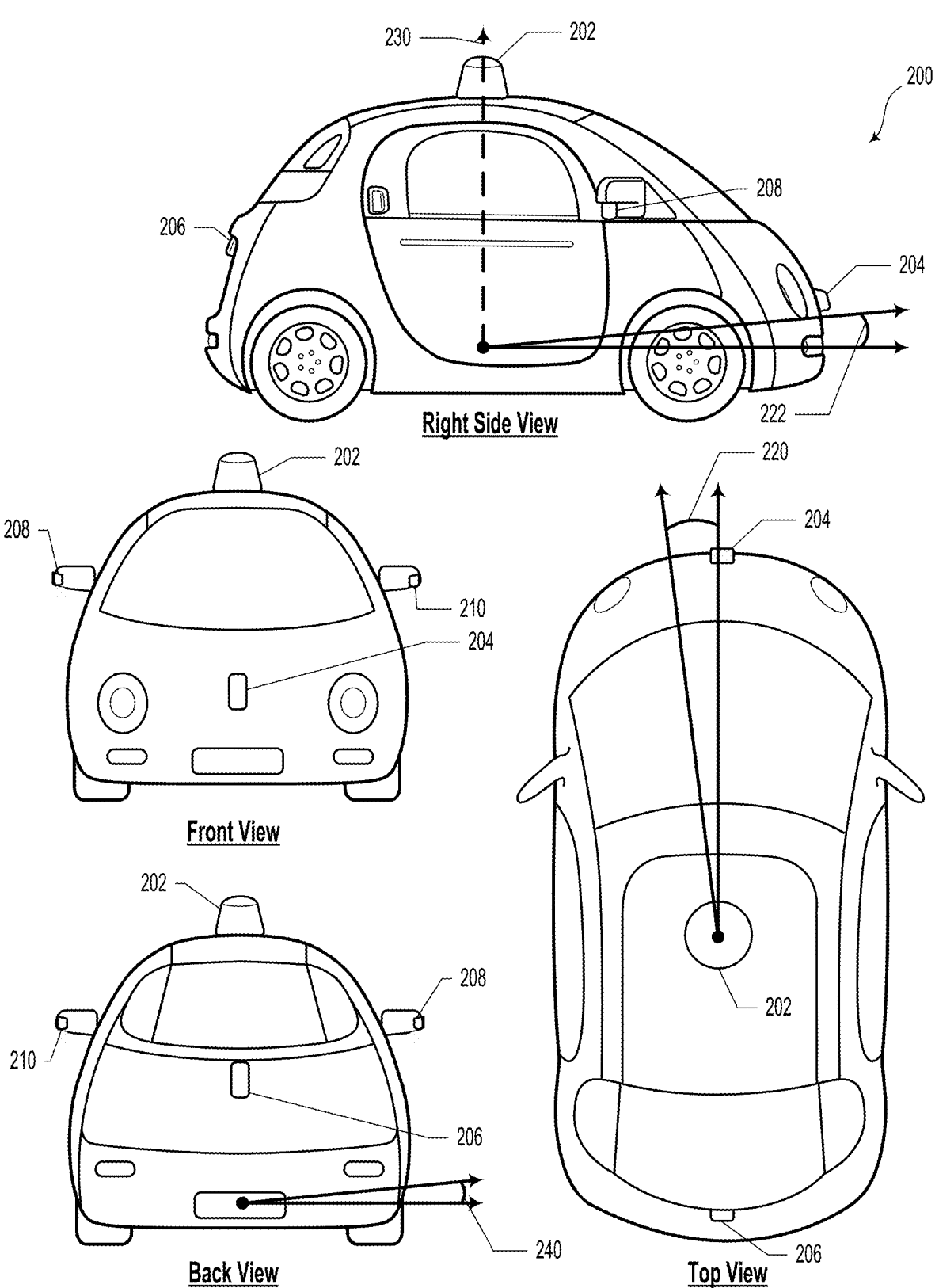
FIG. 2 illustrates a vehicle, according to an example embodiment.

FIG. 2 illustrates a vehicle 200, according to an example embodiment. Vehicle 200 may be similar or identical to vehicle 110 as illustrated and described with reference to FIG. 1. While FIG. 2 illustrates an automobile (e.g., a car), it will be understood that other types of vehicles are possible and contemplated herein. The vehicle 200 may include one or more sensor systems 202, 204, 206, 208, and/or 210. The one or more sensor systems 202, 204, 206, 208, and 210 could be similar or identical to sensors described with regard to system 100. Namely, sensor systems 202, 204, 206, 208, and 210 could include one or more of LIDAR sensors (e.g., LIDAR 112), cameras (e.g., camera 114), and/or RADAR sensors (e.g., RADAR 116). In some examples, sensor system 202 could include a LIDAR system, camera, and a RADAR sensor, however other variations, combinations, and arrangements of sensors are possible.

In an example embodiment, one or more of the sensor systems 202, 204, 206, 208, and 210 could include LIDAR 112, which may be configured to rotate about an axis (e.g., the vertical axis 230) so as to illuminate an environment around the vehicle 200 with light pulses. In an example embodiment, sensor systems 202, 204, 206, 208, and 210 may be configured to provide respective point cloud information that may relate to physical objects within the environment of the vehicle 200. In such scenarios, based on detecting various aspects of reflected light pulses (e.g., the elapsed time of flight, polarization, etc.,), information about the environment may be determined. Additionally or alternatively, LIDAR 112 could include a LIDAR system configured to controllably scan a relatively narrow desired field of view so as to determine point cloud information in a desired portion of the environment around the vehicle. Such a LIDAR system may be configured to provide better point cloud resolution at longer distances.

Similarly to LIDAR 112, camera 114 and/or RADAR 116 could be configured to move in a desired manner with respect to the vehicle 200 so as to obtain dynamic information about the environment of the vehicle 200. For example, camera 114 and/or RADAR 116 may rotate around an axis or could be controllably oriented toward a desired field of view so as to provide information about a desired portion of the environment of the vehicle 200.

While FIG. 2 illustrates sensor systems 202, 204, 206, 208, and 210 as being located at certain locations on the vehicle 200, it will be understood that many other arrangements of the sensors are possible and contemplated.

A pose of the vehicle 200 may be provided in terms of yaw, roll, and pitch. For example, a yaw of vehicle 200 may be provided in terms of an angle 220, the roll of vehicle 200 may be provided in terms of angle 240, and a pitch of vehicle 200 may be provided in terms of angle 222. Other ways to describe the pose of vehicle 200 are possible and contemplated herein.

Several scenarios relating to the correction of an estimated yaw of a vehicle will now be described. While the described scenarios relate to autonomous or semi-autonomous automobiles, it will be understood that the techniques, processes, and methods described herein may be applied to many other types of vehicles as they move within a particular environment.

Self-driving vehicles typically use yaw (heading) information to perform many different driving behaviors (e.g., lane keeping, obstacle avoidance, general navigation and routing, etc.). Thus, better yaw estimation can improve with route planning, map building, surveying, and change detection. The scenarios described below may provide ways to refine yaw estimates from relatively inexpensive sensor systems.

While embodiments described herein may relate to heading (yaw), it is understood that other refinements to estimated pose are possible by comparing various reference data and sensor data. For example, an estimated pitch or roll of a vehicle may be refined using methods or systems described herein.

Figure 3A:
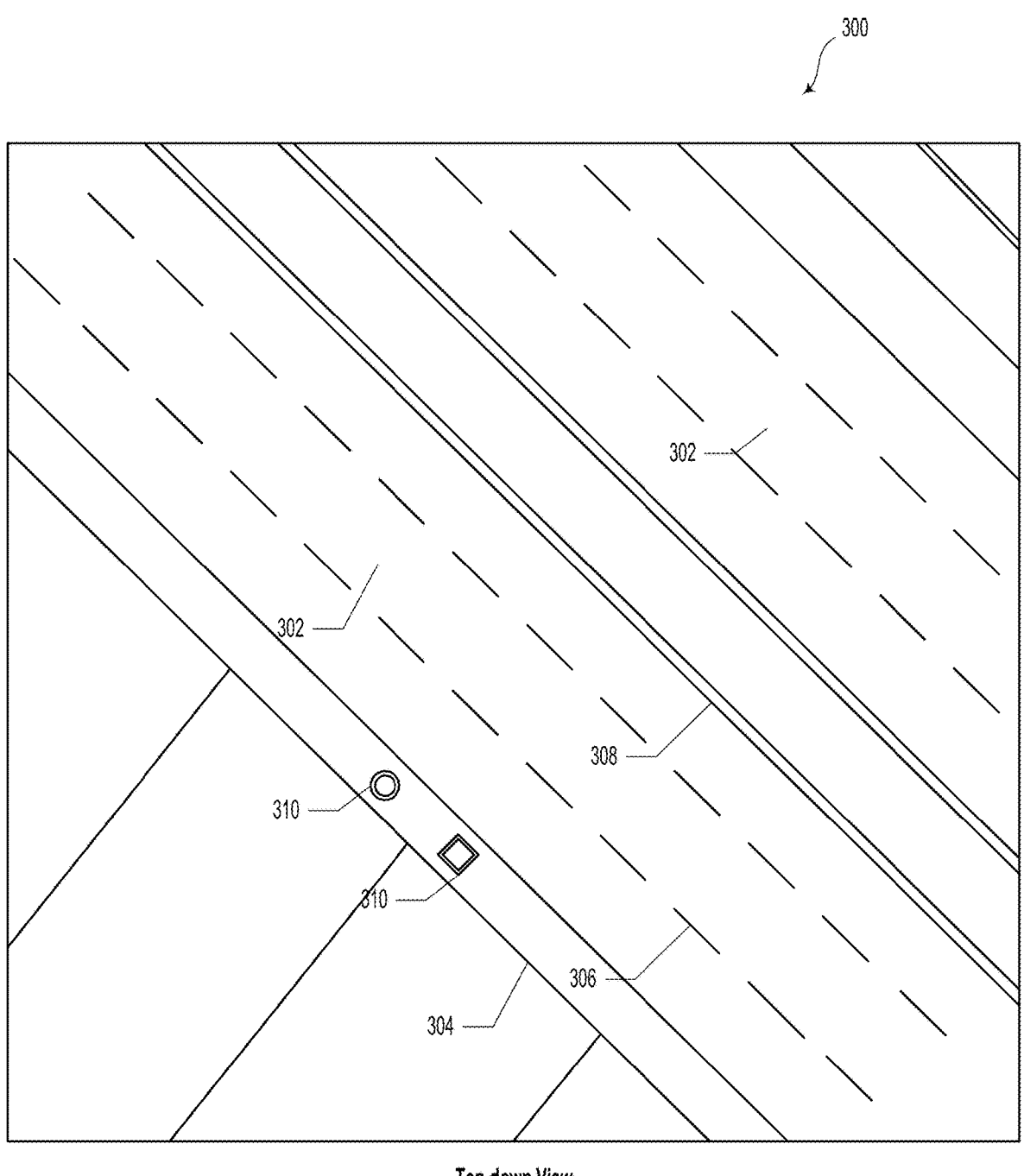
FIG. 3A illustrates a top-down map image, according to an example embodiment.

FIGS. 3A-3D illustrate various images according to example embodiments. FIG. 3A illustrates a top-down map image 300, according to an example embodiment. Top-down map image 300 may be a portion of the reference data 118 as illustrated and described in reference to FIG. 1. The top-down map image 300 may include information about various features of an environment (e.g., an environment around a vehicle). Such features could include, without limitation, roadways 302, sidewalks 304, lane markers 306, curbs/medians 308, and service covers 310 (e.g., manholes or drains). In some embodiments, the top-down map image 300 may be preprocessed to remove temporally varying objects (e.g., moving vehicles, people, bicyclists, intervening cloud cover/haze, etc.) or otherwise standardize/normalize the image.

In some embodiments, top-down map image 300 may be provided as an image captured by overhead image source 130.

Figure 3B:
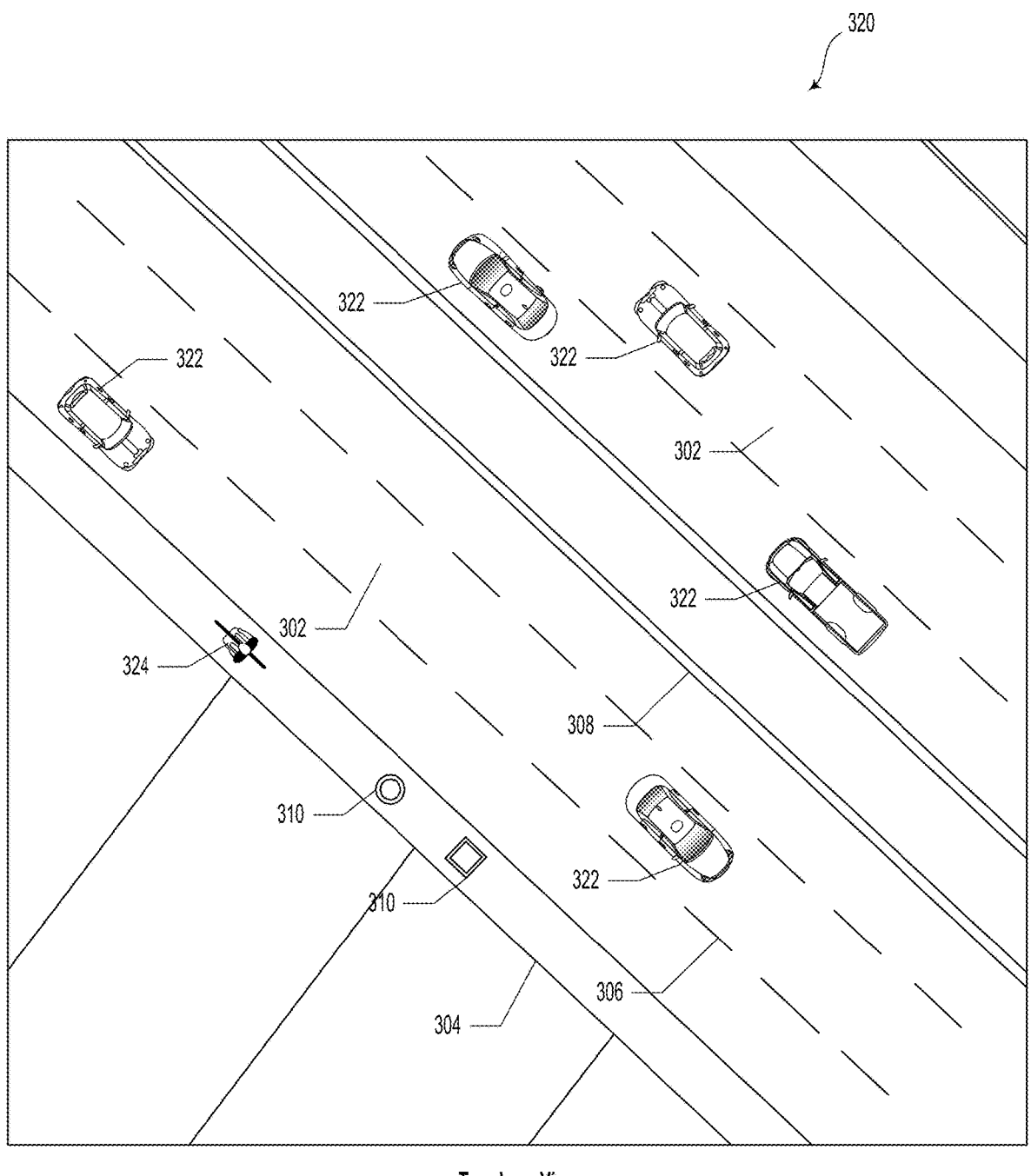
FIG. 3B illustrates a top-down camera image, according to an example embodiment.

FIG. 3B illustrates a top-down camera image 320, according to an example embodiment. The top-down camera image 320 may be similar or identical to one or more images provided by camera 114, as illustrated and described in reference to FIG. 1. In some embodiments, the top-down camera image 320 may include several camera images that have been stitched together and adjusted so that it looks like a top-down image, using, for example, a perspective morphing technique.

Top-down camera image 320 may include, for example, some features that are similar or identical to those of FIG. 3A. For example, in an example embodiment, the top-down camera image 320 may include roadways 302, sidewalks 304, lane markers 306, curbs/medians 308, and/or service covers 310. Furthermore, the top-down camera image 320 may include real-time information about objects in the environment of a vehicle 200. As an example, top-down camera image 320 may include other vehicles 322 and a bicyclist 324.

In some embodiments, the top-down camera image 320 may be adjusted by removing or ignoring temporally varying objects, such as the other vehicles 322 and bicyclist 324. Other objects that are recognized as being likely to change over time (e.g., pedestrians, cloud cover, etc.) may be deleted, ignored, or otherwise handled outside of the methods described elsewhere herein.

Figure 3C:
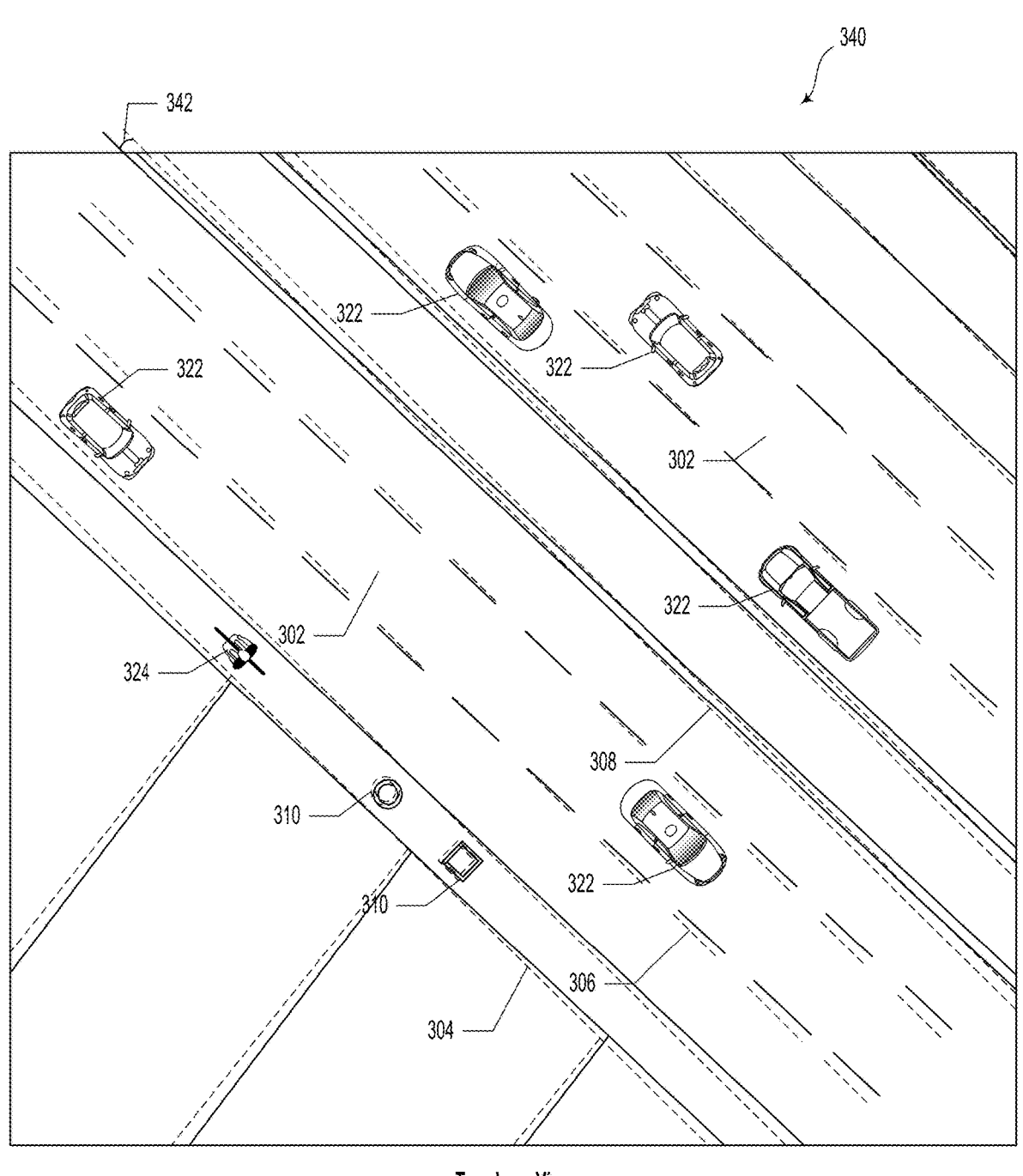
FIG. 3C illustrates a top-down aggregate image, according to an example embodiment.

FIG. 3C illustrates a top-down aggregate image 340, according to an example embodiment. Top-down aggregate image 340 may include a combination, overlay, superposition, juxtaposition, comparison, or another type of analysis of the top-down map image 310 and the top-down camera image 320. As illustrated in FIG. 3C, an embodiment may include the aggregate image 340 being an overlay of the two images. In such a scenario, the top-down aggregate image 340 may include an angle difference 342. The angle difference 342 may include a difference between an estimated heading and an actual heading. In some cases, the angle difference 342 may be provided to the pose estimator 120 and/or the guidance system 124 to improve the estimated heading of the vehicle.

Figure 3D:
FIG. 3D illustrates a top-down aggregate image, according to an example embodiment.

FIG. 3D illustrates a top-down aggregate image 350, according to an example embodiment. Aggregate image 350 may illustrate a combination of map image 300 and camera image 320. Namely, areas in which the camera image 320 corresponds with the map image 300 may be drawn into the aggregate image 350. In some embodiments, aggregate image 350 could include portions without substantive image information. Such portions may correspond to areas that have not been imaged by the camera and/or portions of the image that are substantially different between the map image and the camera image.

Figure 4A:
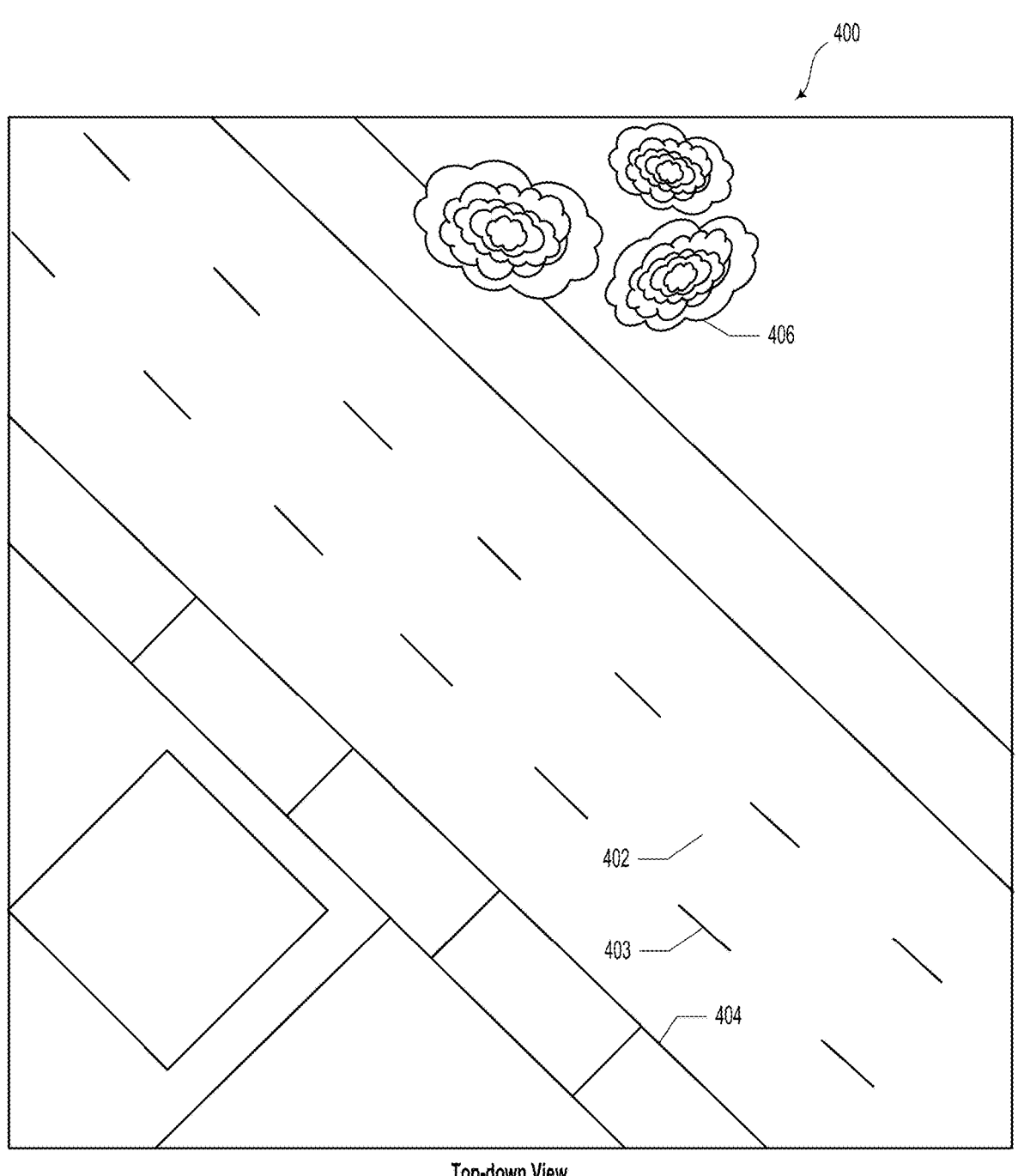
FIG. 4A illustrates a top-down map image, according to an example embodiment.

FIG. 4A illustrates a top-down map image 400, according to an example embodiment. Top-down map image 400 may be formed from reference data 118, as illustrated and described in reference to FIG. 1. Top-down map image 400 may include, without limitation, many different types of objects in the environment of a vehicle. For example, top-down map image 400 may include roadways 402, lane lines 403, sidewalks 404, and trees 406. In some embodiments, the top-down map image 400 may be preprocessed to remove temporally varying objects (e.g., moving vehicles, people, bicyclists, exhaust, etc.) or otherwise standardize/ normalize the image. In example embodiments, vegetation/ foliage may be partially or fully removed from, or ignored within, the top-down map image 400. In some embodiments, top-down map image 400 may be provided as an image captured by overhead image source 130.

Figure 4B:
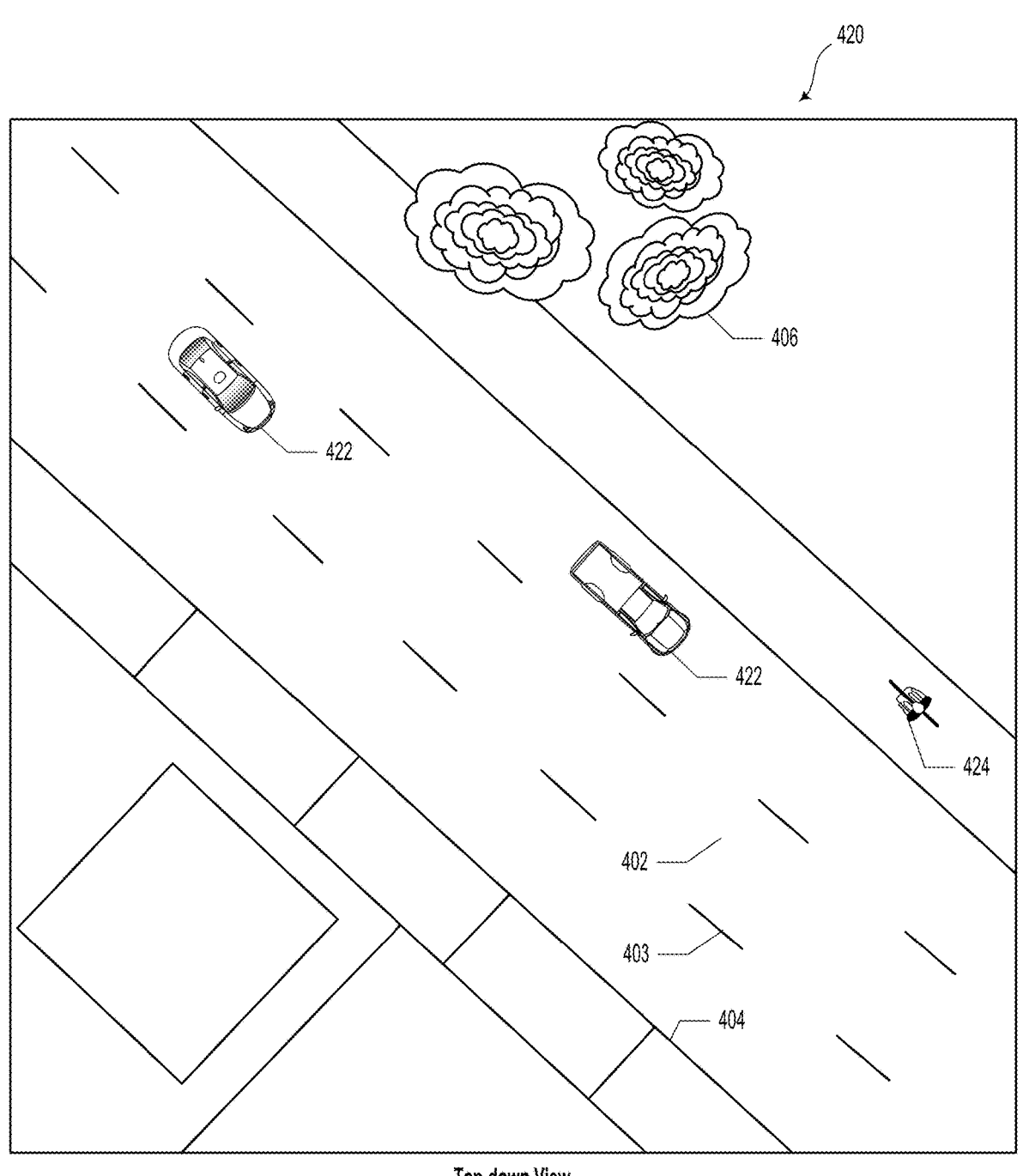
FIG. 4B illustrates a top-down LIDAR image, according to an example embodiment.

FIG. 4B illustrates a top-down LIDAR image 420, according to an example embodiment. The top-down LIDAR image 420 may include at least some of the features described with reference to FIG. 4A. Furthermore, the LIDAR image 420 may include other vehicles 422 and/or other time varying elements. The top-down LIDAR image 420 may include processed data from point cloud data provided by LIDAR 112 or another LIDAR system. For example, LIDAR 112 may provide point cloud information to controller 150 or another type of imaging processing computer system. In such a scenario, the three-dimensional point cloud information may be compressed/flattened/or otherwise adjusted for perspective to form a two-dimensional top-down perspective image 420.

Figure 4C:
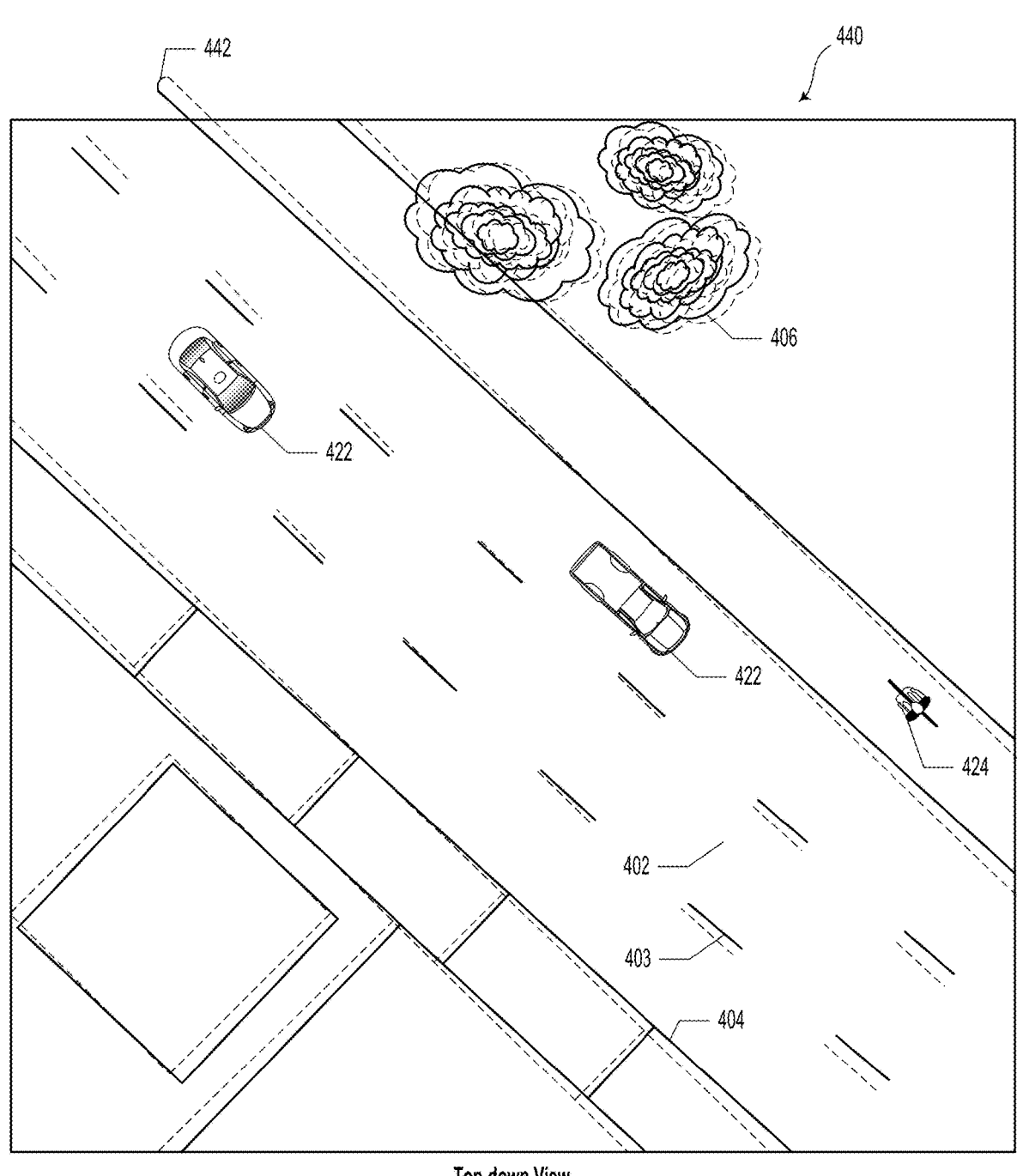
FIG. 4C illustrates a top-down aggregate image, according to an example embodiment.

FIG. 4C illustrates a top-down aggregate image 440, according to an example embodiment. The top-down aggregate image 440 may illustrate a combination, overlay, superposition, or another type of image comparison between the top-down map image 400 and the top-down LIDAR image 420. The top-down aggregate image 440 may include some of the same features as those in FIGS. 4A and 4B. For example, image 440 may include roadways 402, lane lines 403, sidewalks 404, and trees 406. In some embodiments, the top-down aggregate image 440 could, but need not, include the other vehicles 422 and bicyclist 424. In some embodiments, the comparison between the map image 400 and the LIDAR image 420 may ignore, delete, average, or otherwise discount or deprioritize objects recognized to be temporally changing or impermanent.

Figure 4D:
FIG. 4D illustrates a top-down aggregate image, according to an example embodiment.

FIG. 4D illustrates a top-down aggregate image 450, according to an example embodiment. The non-black areas of aggregate image 450 may indicate features from LIDAR image 420 that matches, corresponds, or otherwise similar to that of map image 400. In another embodiment, at least some of the black areas of aggregate image 450 may represent unscanned areas (e.g., no point cloud data) due to such areas being occluded or blocked from the LIDAR's scanning view.

Figure 5A:
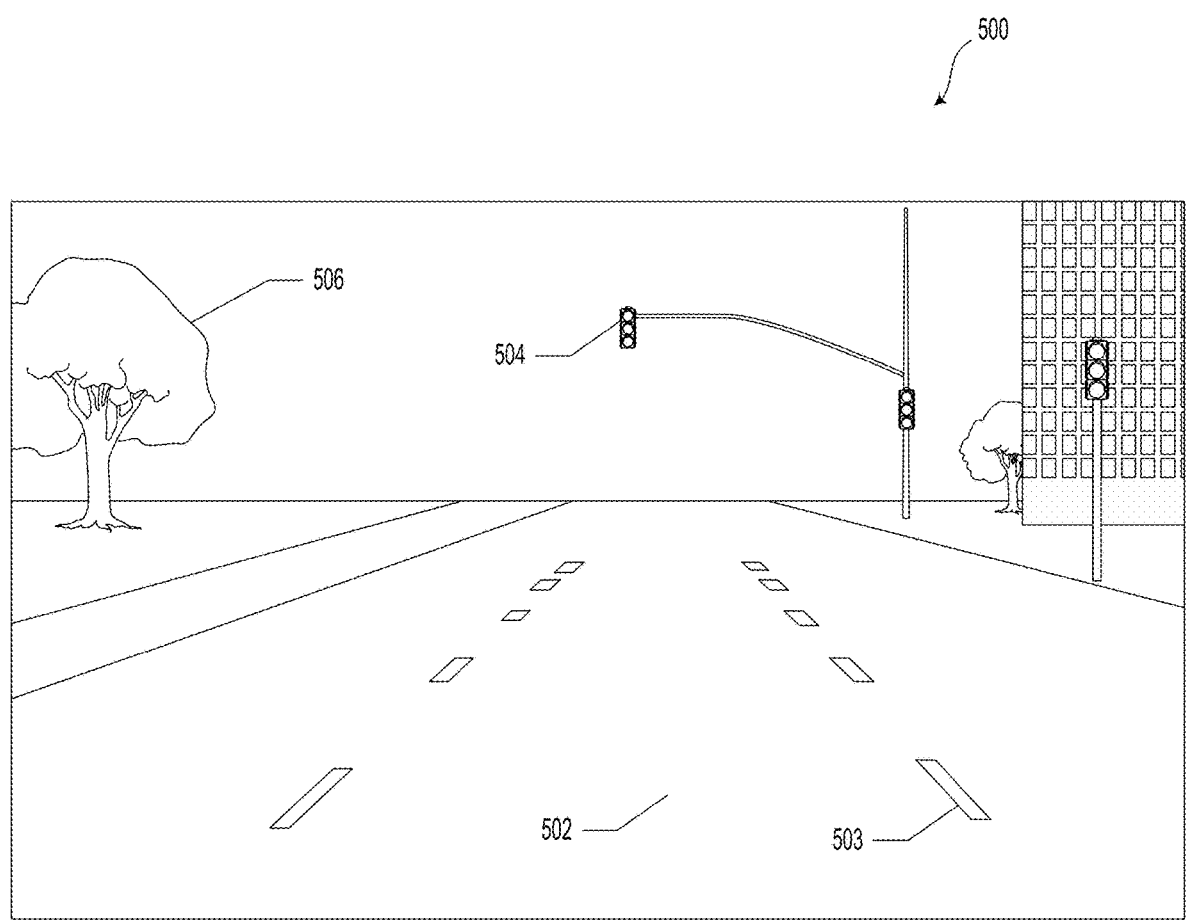
FIG. 5A illustrates a forward map image, according to an example embodiment.

FIG. 5A illustrates a forward map image 500, according to an example embodiment. The forward map image 500 may include a top-down map image (e.g., map images 300 and 400) that has been adjusted, manipulated, or otherwise changed so as to have a similar or identical perspective as that of a forward-looking camera (e.g., camera 114). It will be understood that while a forward-looking camera view is contemplated in embodiments described herein, methods and systems involving other viewpoints and/or perspectives are possible.

The forward map image 500 may include roadways 502, lane lines 503, traffic signs/lights 504, trees 506, buildings, landmarks, etc. Other features that may be provided in a map image are possible and contemplated herein.

Figure 5B:
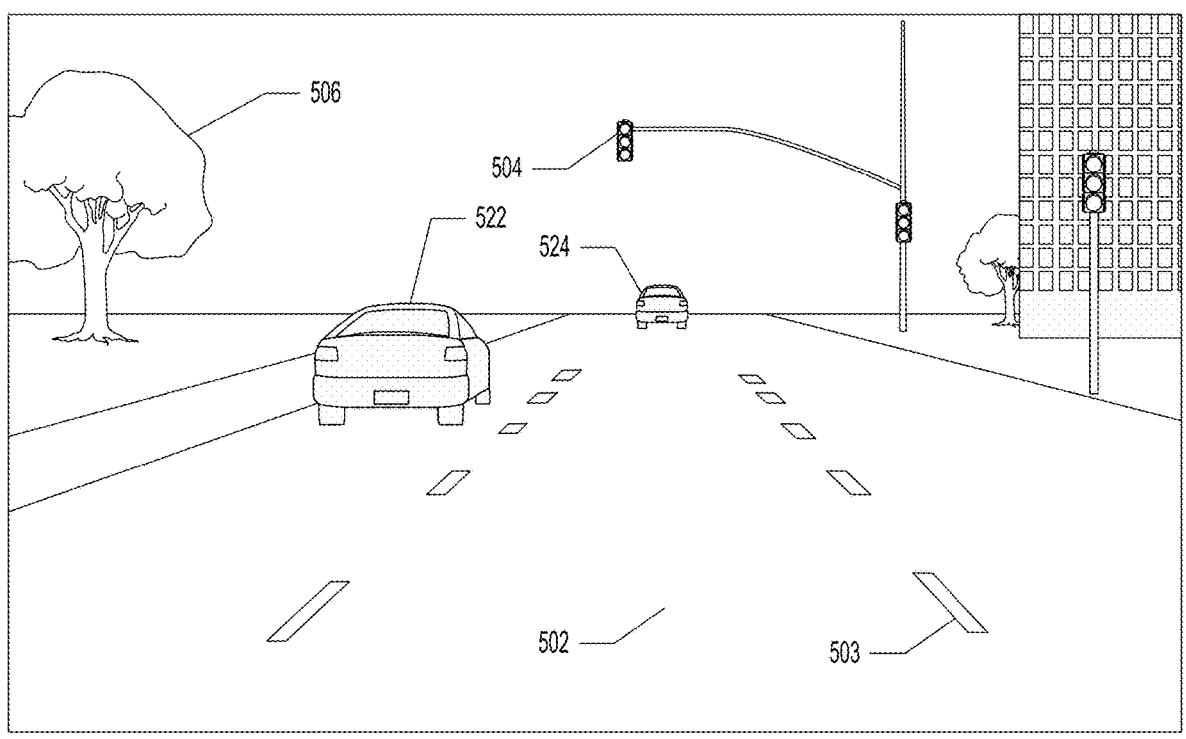
FIG. 5B illustrates a forward camera image, according to an example embodiment.

FIG. 5B illustrates a forward camera image 520, according to an example embodiment. Forward camera image 520 may include similar features to those of forward map image 500. For example, forward camera image 520 could include roadways 502, lane lines 503, traffic signs/lights 504, trees 506, and various other vehicles 522 and 524. In some embodiments, the forward camera image 520 may be captured by a video or still camera (e.g., camera 114). While FIG. 5B includes a forward camera image 520, it is understood that LIDAR point cloud data could transformed so as to form a forward LIDAR "image" with a forward-looking perspective.

Figure 5C:
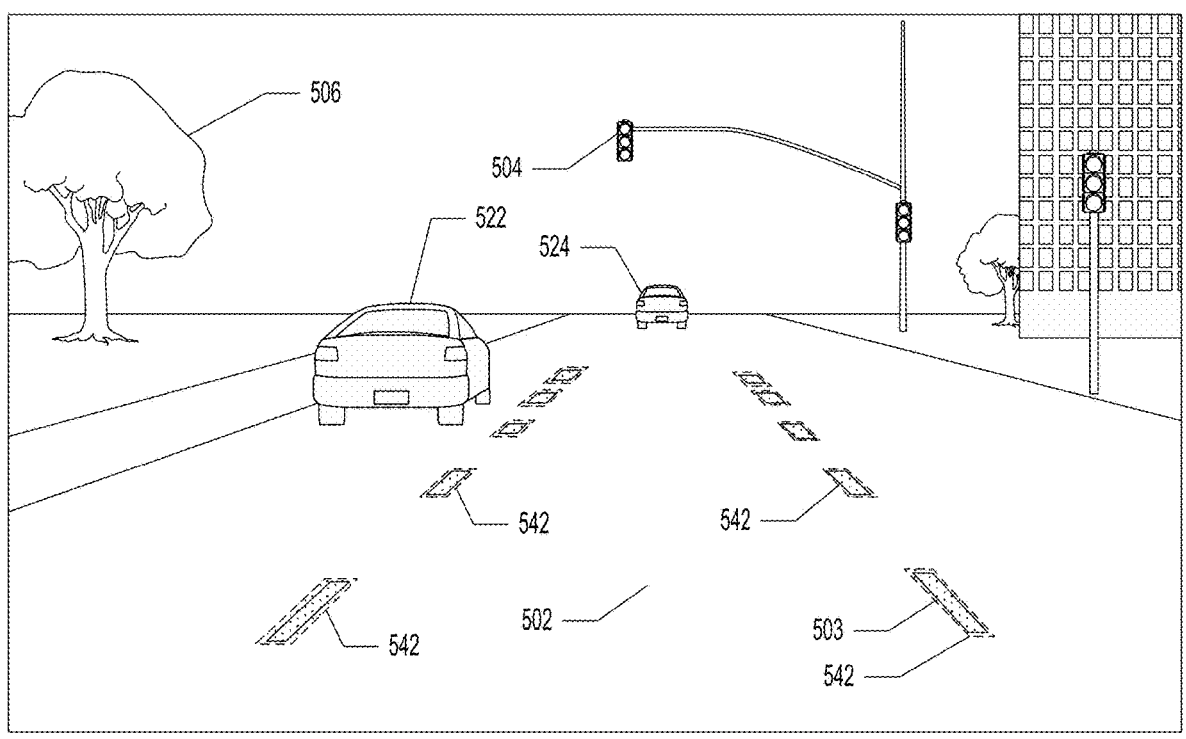
FIG. 5C illustrates a forward aggregate image, according to an example embodiment.

FIG. 5C illustrates a forward aggregate image 540, according to an example embodiment. The forward aggregate image 540 may illustrate a combination, overlay, superposition, or another type of image comparison between the forward map image 500 and the forward camera image 520 (or forward LIDAR image). The forward aggregate image 540 may include some features illustrated in FIGS. 5A and 5B. For example, image 540 may include roadways 502, lane lines 503, and trees 506. In some embodiments, the forward aggregate image 540 could, but need not, include the other vehicles 522 and 524. In some embodiments, the comparison between the forward map image 500 and the forward camera image 520 may ignore, delete, average, or otherwise discount objects recognized to be temporally changing or impermanent. In some embodiments, fiducial images 542 could be superimposed onto or compared to lane lines 503 or other characteristic features or landmarks in image 540. In some cases, fiducial images 542 may be representative of LIDAR, RADAR, and/or map data.

In some cases, the forward aggregate image 540 may suggest that an actual yaw direction may be different than that of an estimated yaw direction. In such cases, the angle difference may be determined based on an image analysis. Also, an adjusted yaw signal may be provided to controller 150, pose estimator 120, guidance system 124 or another control system so as to refine the actual yaw position of the vehicle.

Figure 5D:
FIG. 5D illustrates a forward aggregate image, according to an example embodiment.
Figure 5D:
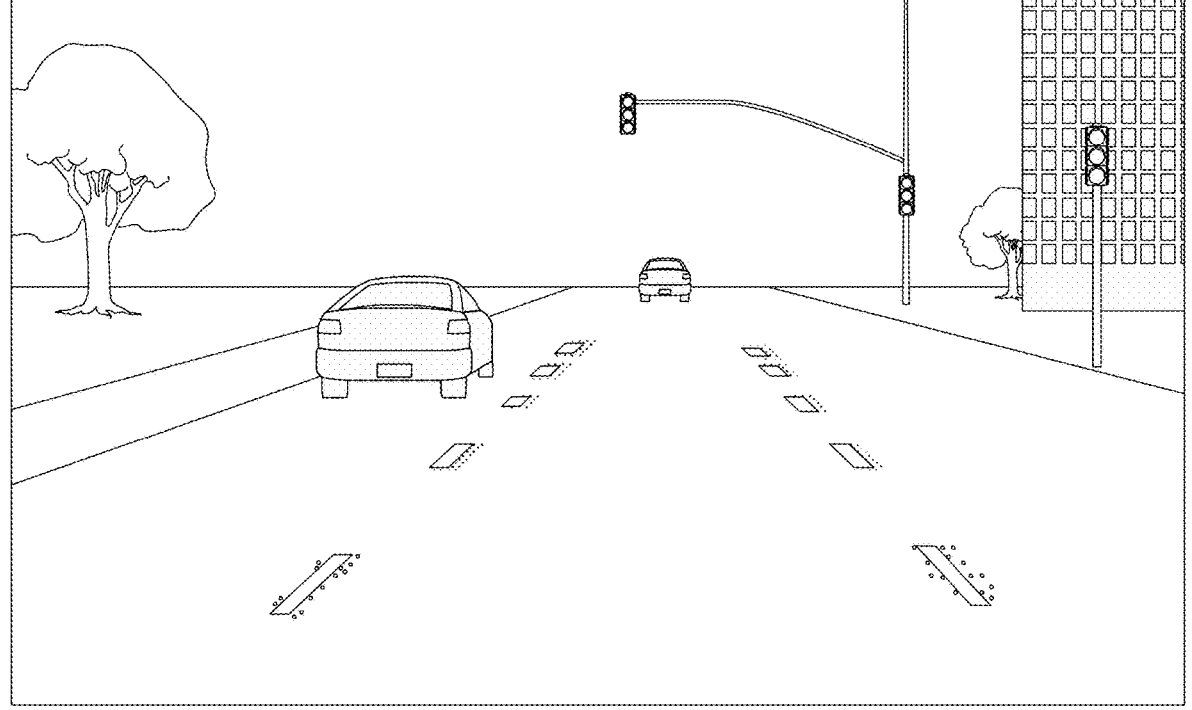

FIG. 5D illustrates a forward aggregate image 550, according to an example embodiment. The dotted shapes near the broken lane lines may include a graphical representation of LIDAR point cloud data, which may be similar or identical to the fiducial images 542 as illustrated and described in reference to FIG. 5C.

III. Example Methods

Figure 6:
FIG. 6 illustrates a method, according to an example embodiment.
Figure 6:
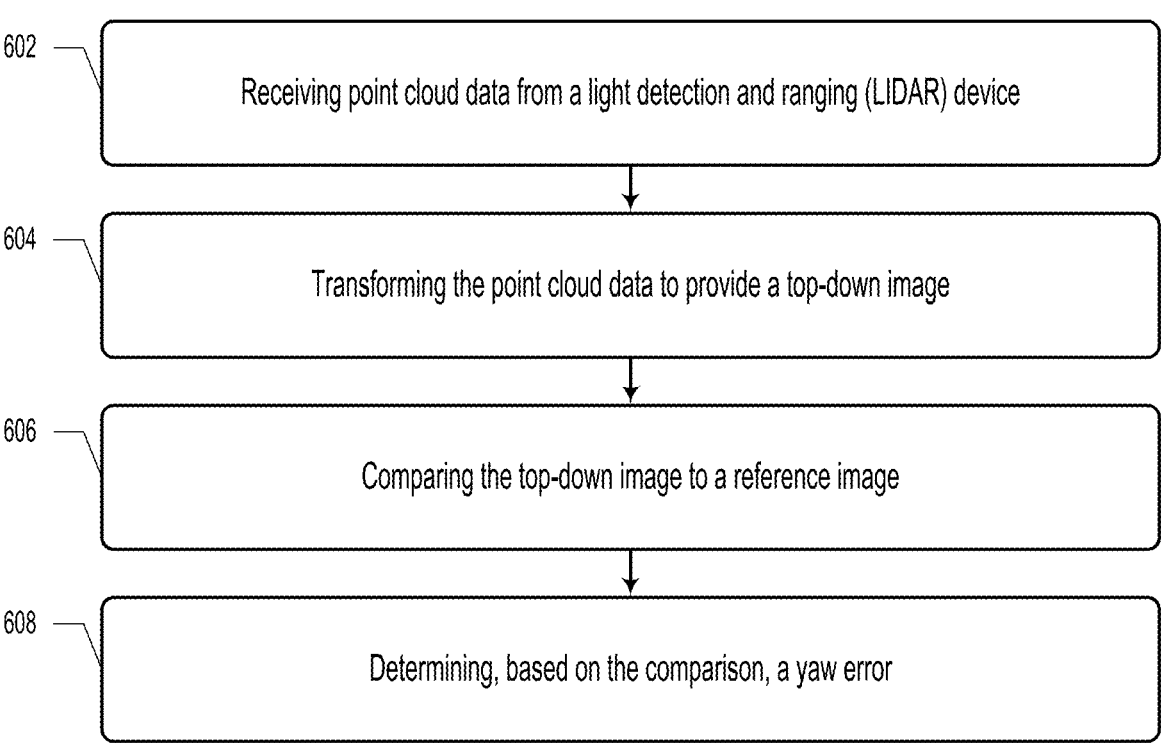

FIG. 6 illustrates a method 600, according to an example embodiment. Method 600 may be carried out, in full or in part, by vehicle 110, controller 150, or vehicle 200 as illustrated and described in reference to FIGS. 1 and 2. Method 600 may include elements that are similar or identical to those illustrated and described with reference to FIGS. 1, 2, 3A-3D, 4A-4D, and/or 5A-5D. It will be understood that the method 600 may include fewer or more steps or blocks than those expressly disclosed herein. Furthermore, respective steps or blocks of method 600 may be performed in any order and each step or block may be performed one or more times. In some embodiments, method 600 may be combined with one or more of methods 700 or 800 as illustrated and described in reference to FIGS. 7 and 8.

Block 602 includes receiving point cloud data from a light detection and ranging (LIDAR) device. In some embodiments, the point cloud data includes information indicative of objects in an environment around a vehicle.

Block 604 includes transforming the point cloud data to provide a top-down image. In such a scenario, the top-down image includes a flattened two-dimensional image of the environment around the vehicle. For example, the transforming could include a scale-invariant feature transform, image flattening, image perspective rotation, and/or a 3D-to-2D image transform. Other ways to represent three-dimensional object information as a two-dimensional, top-down image are contemplated herein.

Block 606 includes comparing the top-down image to a reference image, which may include at least a portion of map data. The reference image may include at least a portion of at least one of: one or more prior camera images, a LIDAR point cloud, RADAR data, satellite imagery, other types of imagery, or other types of information about the environment.

Block 608 includes determining, based on the comparison, a yaw error.

Additionally or optionally, method 600 may include providing an adjustment signal to a pose estimator of a vehicle based on the determined yaw error. In such scenarios, the method 600 may additionally include determining, with the inertial pose estimator, a yaw orientation of the vehicle and determining a refined yaw orientation based on the adjustment signal and the determined yaw orientation.

Figure 7:
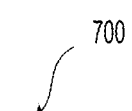
FIG. 7 illustrates a method, according to an example embodiment.
Figure 7:
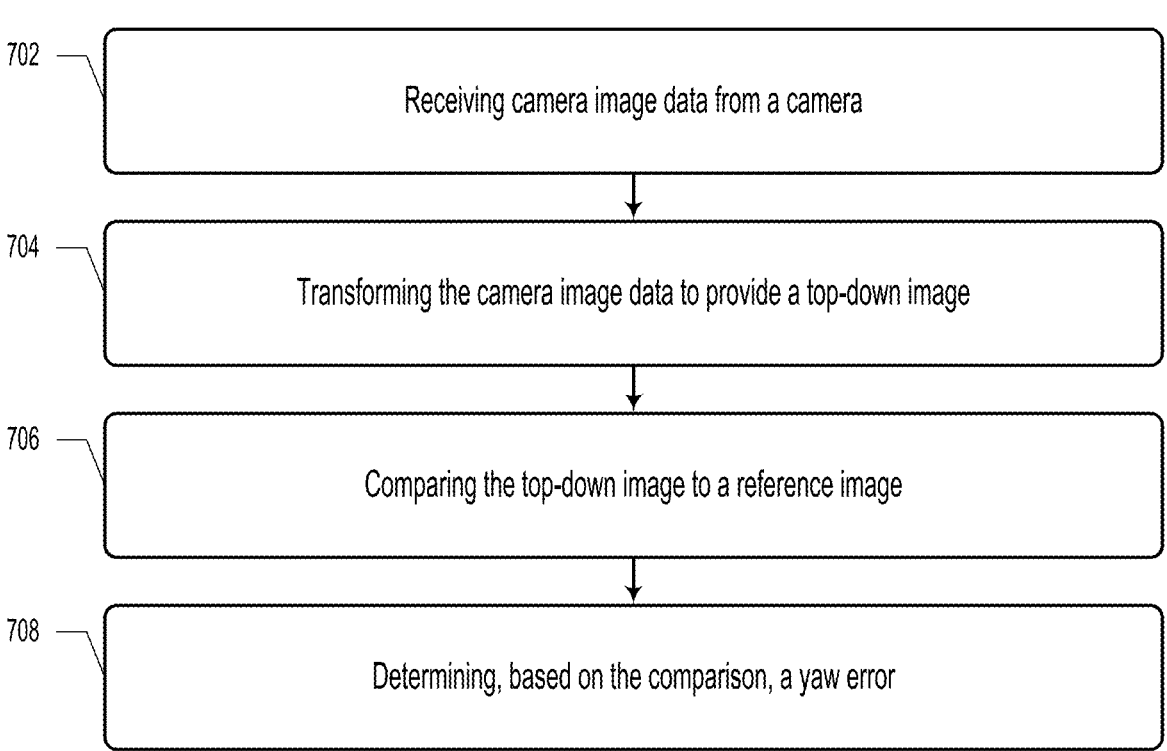

FIG. 7 illustrates a method 700, according to an example embodiment. Method 700 may be carried out, in full or in part, by vehicle 110, controller 150, or vehicle 200 as illustrated and described in reference to FIGS. 1 and 2. Method 700 may include elements that are similar or identical to those illustrated and described with reference to FIGS. 1, 2, 3A-3D, 4A-4D, and/or 5A-5D. It will be understood that the method 700 may include fewer or more steps or blocks than those expressly disclosed herein. Furthermore, respective steps or blocks of method 700 may be performed in any order and each step or block may be performed one or more times. In some embodiments, method 700 may be combined with one or more of methods 600 or 800 as illustrated and described in reference to FIGS. 6 and 8.

Block 702 includes receiving camera image data from a camera. As described elsewhere herein, the camera image data may include information indicative of an environment around a vehicle. For example, the camera image data may include information about a vehicle roadway, driving path, obstacles, landmarks, and/or other objects in the vehicle's environment.

Block 704 includes transforming the camera image data to provide a top-down image. In an example embodiment, the top-down image may include a flattened two-dimensional image of the environment around the vehicle.

Block 706 includes comparing the top-down image to a reference image. In some embodiments, the reference image includes at least a portion of map data. For example, the reference image may include at least a portion of at least one of: one or more prior camera images, a LIDAR point cloud, RADAR data, satellite imagery, other types of imagery, or other information about the environment.

Block 708 includes determining, based on the comparison, a yaw error.

The method 700 may also include providing an adjustment signal to a pose estimator of a vehicle based on the determined yaw error.

In an example embodiment, the method 700 may include determining, e.g., with the pose estimator, a yaw orientation of the vehicle. Based on the adjustment signal, the method 700 may also include determining a refined yaw orientation based on the adjustment signal and the determined yaw orientation.

FIG. 8 illustrates a method 800, according to an example embodiment. Method 800 may be carried out, in full or in part, by vehicle 110, controller 150, or vehicle 200 as illustrated and described in reference to FIGS. 1 and 2. Method 800 may include elements that are similar or identical to those illustrated and described with reference to FIGS. 1, 2, 3A-3D, 4A-4D, and/or 5A-5D. It will be understood that the method 800 may include fewer or more steps or blocks than those expressly disclosed herein. Furthermore, respective steps or blocks of method 800 may be performed in any order and each step or block may be performed one or more times. In some embodiments, method 800 may be combined with one or more of methods 600 or 700 as illustrated and described in reference to FIGS. 6 and 8.

Block 802 includes receiving reference data. In such a scenario, the reference data may be information indicative of an overhead perspective of a scene. In some embodiments, the reference data includes at least a portion of at least one of: one or more prior camera images, a LIDAR point cloud, RADAR data, satellite imagery, other types of imagery, or other information about the environment.

Block 804 includes transforming the reference data so as to correspond to a field of view of a camera. The transforming could include, without limitation, 3D-to-2D image transform, a scale-invariant feature transform, or another type of image processing transform configured to adjust a perspective of image data, point cloud data, or other types of environmental data. In some embodiments, the transforming could change reference data from an overhead perspective to a forward-facing perspective. Other types of image processing transforms are possible and contemplated herein.

Block 806 includes receiving camera image data from the camera. In an example embodiment, the camera image data may include a flattened two-dimensional image of at least a portion of the environment around the vehicle.

Block 808 includes comparing the transformed reference data to the camera image data. In some embodiments, the camera image data corresponds to at least a portion of the transformed reference data. In some scenarios, the reference data and/or the camera image data may be processed with at least one of: an image difference algorithm, an image homography algorithm, or an image rectification algorithm.

Block 810 includes determining, based on the comparison, a yaw error. In some embodiments, method 800 further includes providing an adjustment signal to a pose estimator of a vehicle based on the determined yaw error.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:

capturing camera image data using a camera, wherein the camera image data comprises information indicative of an environment around a vehicle;

transforming the camera image data to provide a top-down image;

receiving a reference image from an overhead image source;

comparing the top-down image to the reference image; and determining, based on the comparison, a yaw error.

2. The method of claim 1, further comprising:

adjusting a yaw orientation of the vehicle based on the yaw error, wherein adjusting the yaw orientation of the vehicle comprises updating a driving path of the vehicle.

3. The method of claim 1, wherein the overhead image source is at least one of an aircraft or a satellite.

4. The method of claim 1, further comprising adjusting the top-down image by removing temporally varying objects.

5. The method of claim 1, wherein capturing camera image data comprises capturing the camera image data using a plurality of cameras configured to capture a plurality of images comprising information indicative of a 360 degree field of view of the environment.

6. The method of claim 5, wherein transforming the camera image data comprises combining the plurality of images to form the top-down image, wherein the combining comprises one or more of projective geometry transforms or perspective morphing techniques applied to the plurality of images.

7. The method of claim 1, further comprising forming an aggregate image based on a combination, overlay, or superposition image comparison between the reference image and the top down image.

8. The method of claim 7, wherein determining the yaw error comprises comparing an actual yaw direction in the camera image data to an estimated yaw direction in the reference image.

9. The method of claim 7, wherein the aggregate image comprises an indication of the yaw error and wherein the yaw error comprises an angle difference between an estimated heading and an actual heading.

10. The method of claim 1, further comprising:

providing an adjustment signal to a pose estimator based on the determined yaw error.

11. The method of claim 1, wherein the reference image comprises at least a portion of at least one of: one or more prior camera images, a prior LIDAR point cloud, prior RADAR data, satellite imagery, or map data.

12. The method of claim 1, wherein comparing the top-down image to the reference image comprises performing normalized cross-correlation, grayscale matching, gradient matching, histogram matching, edge detection, scale-invariant feature transform (SIFT), or speeded-up robust features (SURF).

13. The method of claim 8, wherein the top-down image comprises a flattened two-dimensional image of the environment around the vehicle.

14. A method comprising:

capturing information indicative of a representation of a three dimensional environment;

transforming the information to provide a top-down representation of the three dimensional environment;

receiving reference information from an overhead source;

comparing the top-down representation to the reference information; and determining, based on the comparison, a rotational angle difference.

15. The method of claim 14, wherein transforming the information to provide a top-down representation of the three dimensional environment comprises transforming the information with at least one of: a scale-invariant feature transform, image flattening, image perspective rotation, or 3D-to-2D image transform.

16. The method of claim 14, wherein the reference information comprises at least one of: a previously captured camera image, previously captured LIDAR point cloud data, previously captured RADAR data, map data, or satellite imagery.

17. The method of claim 14, wherein transforming the information to provide the top-down representation comprises forming an aggregated image based on at least two top-down representations, wherein forming the aggregated image comprises applying at least one of: a combination, an overlay, a superposition, a juxtaposition, or a comparison of the at least two top-down representations.

18. The method of claim 14, wherein comparing the top-down representation to the reference information comprises performing at least one of: a normalized cross-correlation, grayscale matching, gradient matching, histogram matching, edge detection, scale-invariant feature transform (SIFT), or speeded-up robust features (SURF).

19. The method of claim 14, further comprising:

providing an adjustment signal to a pose estimator of a vehicle based on the determined rotational angle difference.

20. The method of claim 19, further comprising:

determining, with the pose estimator, a yaw orientation of the vehicle; and determining a refined yaw orientation based on the adjustment signal and the determined yaw orientation of the vehicle.

* * * * *